United States Patent
Raetzman et al.

(10) Patent No.: US 9,699,954 B2
(45) Date of Patent: Jul. 11, 2017

(54) ADJUSTABLE DOWN STOP FOR AGRICULTURAL CLOSING DISCS

(71) Applicant: CNH Industrial America LLC, New Holland, PA (US)

(72) Inventors: Ryan R. Raetzman, Lemont, IL (US); Brian J. Anderson, Yorkville, IL (US); Johnathon R. Dienst, DeKalb, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/788,246

(22) Filed: Jun. 30, 2015

(65) Prior Publication Data
US 2017/0000010 A1   Jan. 5, 2017

(51) Int. Cl.
*A01C 5/06* (2006.01)
*A01B 73/06* (2006.01)
*A01C 7/20* (2006.01)

(52) U.S. Cl.
CPC ............ *A01C 5/066* (2013.01); *A01C 5/068* (2013.01); *A01B 73/065* (2013.01); *A01C 7/208* (2013.01)

(58) Field of Classification Search
CPC combination set(s) only.
See application file for complete search history.

(56) References Cited

U.S. PATENT DOCUMENTS

| | | | |
|---|---|---|---|
| 3,626,877 A * | 12/1971 | Hansen | A01C 7/04 111/136 |
| 4,712,492 A | 12/1987 | Murray | |
| 5,230,208 A | 7/1993 | Hess et al. | |
| 5,676,073 A * | 10/1997 | Bergland | A01C 5/06 111/194 |
| 5,697,455 A | 12/1997 | Deckler | |
| 5,724,903 A * | 3/1998 | Yoder | A01C 5/068 111/194 |
| 5,829,535 A | 11/1998 | Line | |
| 5,845,471 A | 12/1998 | Seegert et al. | |
| 5,887,664 A | 3/1999 | Whalen et al. | |

(Continued)

FOREIGN PATENT DOCUMENTS

| | | |
|---|---|---|
| EP | 0 878 117 A1 | 11/1998 |
| EP | 1 310 145 A2 | 5/2003 |

(Continued)

*Primary Examiner* — Alicia Torres
(74) *Attorney, Agent, or Firm* — Rebecca L. Henkel; Rickard K. DeMille

(57) ABSTRACT

A planter includes a chassis and a row unit carried by the chassis. The row unit includes a unit body carried by the chassis; a metering device carried by the unit body; at least one furrowing disc carried by the unit body; at least one pressing wheel carried by the unit body behind the furrowing disc(s); a travel arm carried by and pivotally movable relative to the unit body that defines a travel path; at least one closing disc positioned behind the furrowing disc(s) and in front of the pressing wheel(s) and pivotally movable along the travel path by the travel arm; and a stop having a stop portion placed in the travel path that limits a vertical travel of the closing disc(s) and at least one adjustment feature formed thereon that allows the stop portion to be held in at least two different locations in the travel path.

14 Claims, 5 Drawing Sheets

(56) References Cited

U.S. PATENT DOCUMENTS

| | | |
|---|---|---|
| 6,659,193 B1 | 12/2003 | Best et al. |
| 6,688,405 B2 | 2/2004 | Steinlage |
| 6,701,857 B1 | 3/2004 | Jensen et al. |
| 6,895,876 B2 | 5/2005 | Bergere et al. |
| 7,240,627 B1 | 7/2007 | Whalen et al. |
| 7,410,005 B2 | 8/2008 | Lung et al. |
| 7,481,278 B1 | 1/2009 | Pomedli et al. |
| 7,540,246 B2 | 6/2009 | Friesen et al. |
| 7,681,656 B2 | 3/2010 | Jagow et al. |
| 7,857,072 B2 | 12/2010 | Kovach et al. |
| 7,946,232 B2 | 5/2011 | Patwardhan et al. |
| 8,047,147 B2 | 11/2011 | Harnetiaux |
| 8,186,287 B2 | 5/2012 | Schilling et al. |
| 8,275,525 B2 | 9/2012 | Kowalchuk et al. |
| 8,291,997 B2 | 10/2012 | Kovach et al. |
| 8,342,108 B2 | 1/2013 | Schilling et al. |
| 8,342,258 B2 | 1/2013 | Ryder et al. |
| 8,359,987 B2 | 1/2013 | Schillig et al. |
| 8,479,669 B2 | 7/2013 | Shoup |
| 8,635,962 B2 | 1/2014 | Schilling |
| 8,672,047 B2 | 3/2014 | Schilling |
| 8,678,102 B2 | 3/2014 | Ryder et al. |
| 8,684,102 B2 | 4/2014 | Ryder et al. |
| 8,763,717 B2 | 7/2014 | Kovach et al. |
| 8,826,836 B2 | 9/2014 | Van Buskirk et al. |
| 2011/0313575 A1 | 12/2011 | Kowalchuk et al. |
| 2013/0160684 A1 | 6/2013 | Whalen et al. |
| 2013/0206431 A1* | 8/2013 | Freed .................. A01B 49/027 172/1 |
| 2014/0151075 A1 | 6/2014 | Ryder et al. |
| 2014/0158385 A1 | 6/2014 | Ryder et al. |
| 2014/0224513 A1 | 8/2014 | Van Buskirk et al. |

FOREIGN PATENT DOCUMENTS

| | | |
|---|---|---|
| EP | 1 391 147 A1 | 2/2004 |
| EP | 1 723 842 A1 | 11/2006 |
| EP | 2 462 794 A1 | 6/2012 |
| WO | 2014/031858 A1 | 2/2014 |

* cited by examiner

ADJUSTABLE DOWN STOP FOR AGRICULTURAL CLOSING DISCS

BACKGROUND OF THE INVENTION

1. Field of the Invention

The present invention relates to agricultural planters, and, more particularly, to agricultural planter row units.

2. Description of the Related Art

Agricultural planters are commonly used implements to plant seeds in soil. An agricultural planter can include a chassis that carries one or more storage tanks carrying seed, and chemical applications that are to be applied to the field during the planting operation, a hitch mechanism that attaches to a tractor or other implement pulled by a tractor, and a tool bar that row units can be connected to so they are carried by the chassis. The planter can also include a pneumatic system carried by the chassis that supplies pressurized air to transport the seeds or other particulate from the storage tanks to the row units.

Each row unit of the agricultural planter places seeds in the field. Typically, the row units are laterally arranged along a length of the tool bar so that as the planter is pulled across the field, each row unit plants seeds at predefined intervals along the path it is pulled across. To plant seeds, the row units perform four main operations as they are pulled: opening a trench in the soil; placing a seed into the formed trench at appropriate intervals; closing the formed trench to put soil on top of the placed seed; and packing soil on top of the seed to provide desirable soil contact with the placed seed. To open a trench in the soil, a furrowing disc system, which may include an opening disc, cuts into the soil and rotates, dislocating soil as it rotates to form the trench. Once the trench is open, a seed is placed in the trench by a metering device which receives seeds from the main storage tank(s) or a row unit storage tank and typically utilizes a combination of differential air pressure, to select the seed, and gravity to place the seed in the trench at predefined intervals along the pulled path so that adjacent seeds in the row are not too close to one another. One or more closing discs carried behind the furrowing disc are pressed into the soil and also rotate as the planter is pulled to replace soil dislocated by the furrowing disc in the trench or dislocate adjacent soil into the trench to cover the seed placed in the trench with soil. Finally, a pressing wheel carried behind the closing disc(s) exerts pressure on the soil covering the seed to press the soil down onto the seed and provide good soil contact with the seed. By having multiple row units working in unison as the planter is pulled across a field, many seeds can be effectively planted in an efficient manner.

To collapse the formed trench and cover the placed seed with soil, the closing disc(s) must be in contact with the soil. In order to keep continuous contact with the soil, a biasing element may be connected to the closing disc(s) to force the closing disc(s) into the soil and resist upward forces that occur during travel from lifting the closing disc(s) out of contact with the soil. One problem that can occur is that the closing disc(s) can bury itself due to excessive downward travel and pressing into the soil. This can lead to soil flow problems, disrupted seed placement and tear-out of the trench sidewall.

What is needed in the art is a way to limit the vertical travel of the closing disc(s).

SUMMARY OF THE INVENTION

The present invention provides an agricultural planter equipped with one or more closing discs attached to a travel arm defining a travel path and an adjustable stop placed in the travel path to limit a vertical travel of the closing disc(s).

The invention in one form is directed to a planting apparatus including a chassis and a row unit carried by the chassis. The row unit includes a unit body carried by the chassis; a metering device carried by the unit body; at least one furrowing disc carried by the unit body; at least one pressing wheel carried by the unit body behind the furrowing disc in a direction of travel; a travel arm carried by and pivotally movable relative to the unit body that defines a travel path; at least one closing disc positioned behind the at least one furrowing disc and in front of the at least one pressing wheel in the direction of travel and pivotally movable along the travel path by the travel arm; and a stop having a stop portion placed in the travel path of the travel arm that is configured to limit a vertical travel of the at least one closing disc. The stop has at least one adjustment feature formed thereon that allows the stop portion to be held in at least two different locations in the travel path.

The invention in another form is directed to an adjustable stop for an agricultural row unit that includes a stop portion defining a first end and a second end; a first bearing portion connected to the first end of the stop portion; a second bearing portion connected to the second end of the stop portion; and an adjustment portion connected to the first bearing portion and/or the second bearing portion and defining a perimeter. The adjustment portion has at least one adjustment feature formed on the perimeter.

An advantage of the present invention is that the vertical travel of the one or more closing discs can be adjustably limited by changing the location of the stop portion.

Another advantage is that the relative location of the stop portion in the travel path can be easily adjusted.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
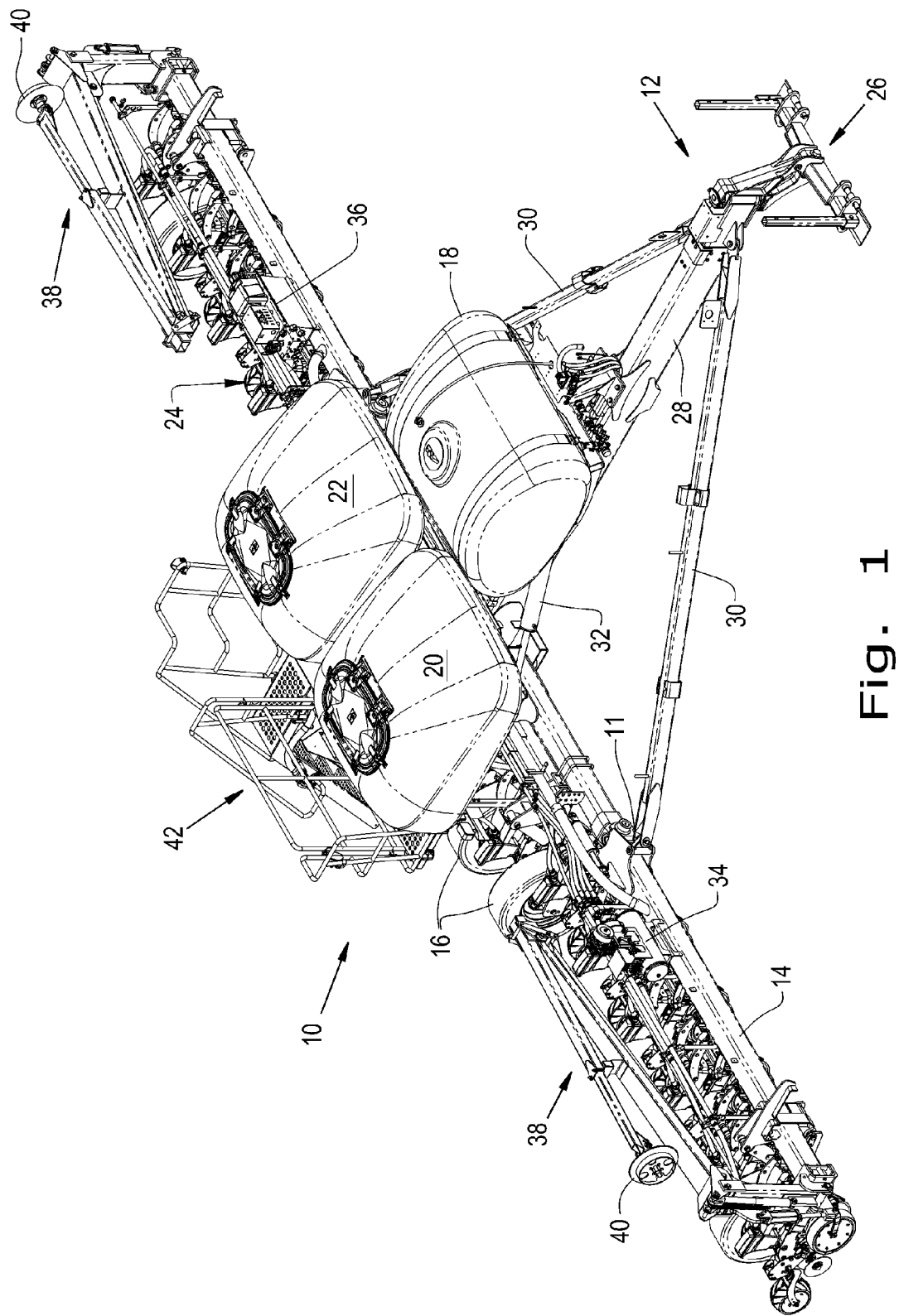
FIG. 1 is a perspective view of an embodiment of an agricultural planting apparatus according to the present invention.

Referring now to the drawings, and more particularly to FIG. 1, there is shown an embodiment of an agricultural planter 10 according to the present invention which generally includes a chassis 11 forming a support structure for components of the planter 10. The planter 10 can include a hitch assembly 12 at a front of the planter 10 connected to a tool bar 14 to form the chassis 11, main wheels 16 carried by the chassis 11 near a rear of the planter 10, one or more storage tanks 18, 20, 22 carried by the chassis 11 that can be filled with seed or other agriculture material, and a plurality of row units 24 connected to the tool bar 14 and arranged laterally across a length of the tool bar 14 so that they are carried by the chassis. The hitch assembly 12 can include a hitch 26 configured to be connected to a tractor or other agricultural implement (not shown) so that the planter 10 can be pulled in a forward direction of travel. The hitch 26 can be integrally formed with or connected to a hitch bar 28 that is connected to the tool bar 14 by bracing bars 30 and one or more cylinders 32. As can be seen throughout FIG. 1, the planter 10 can also have various hydraulic, pneumatic, and electrical lines (unnumbered) throughout to support various cylinders and systems that are included on the planter 10, such as a pneumatic system 34 connected to the tool bar 16 and an electric generator 36 also connected to the tool bar 16. A marking device 38 can be connected to each lateral end of the tool bar 14 and extendable so that a marking disc 40 of the marking device 38 can create a line in the soil as the planter 10 is pulled that helps a user in positioning the planter 10 to create subsequent rows. A stair assembly 42 can be mounted to the back of the planter 10 to allow an operator to access the storage tanks 20 and 22.

Figure 2:
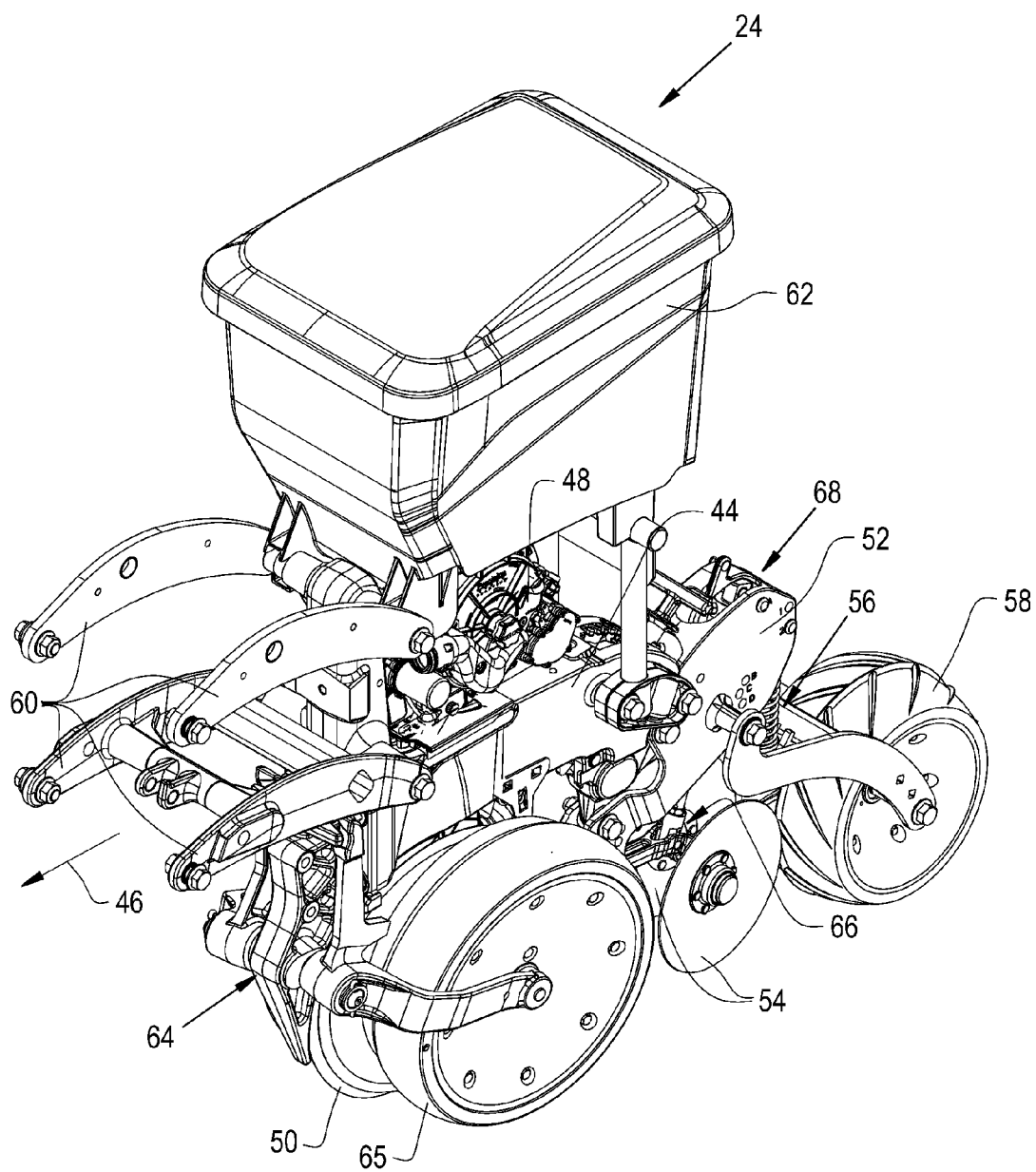
FIG. 2 is a perspective view of an embodiment of a row unit included with the agricultural planting apparatus shown in FIG. 1.

Referring now to FIG. 2, an embodiment of an individual row unit 24 is shown that is not connected to the tool bar 14. As can be seen, the row unit 24 generally includes a unit body 44 that can be carried by the chassis 11 in a direction of travel, signified by arrow 46, a metering device 48 carried by the unit body 44, a furrowing disc 50 connected to the unit body 44, a mounting body 52 connected to the unit body 44, closing discs 54 carried by the unit body 44, and a pressing wheel 58 connected to the mounting body 52 that is positionable behind the closing discs 54. As can be seen, the unit body 44 can have toolbar connecting arms 60 bolted thereon that can be connected to the chassis 11 in a parallel linkage arrangement so that the row unit 24 can be carried by the chassis 11 in the direction of travel 46. In this sense, the unit body 44 acts as a row unit chassis to keep the various components of the row unit 24 together during operation.

The metering device 48 carried by the unit body 44 is configured to receive seed from a unit storage tank 62 (also known as a mini-hopper) that is carried by the unit body 44 and can connect to one or more of the main storage tanks 18, 20 or 22. For ease of illustration, the electrical and pneumatic lines that would normally be connected to the metering device 48 have been omitted. The metering device 48 can be configured as any type of device which is capable of controllably metering out seeds to be planted by the row unit 24 during operation of the planter 10. For example, the metering device 48 can utilize a metering wheel (not shown) in combination with a vacuum formed in the metering device 48 to selectively pull seeds into a seed drop (not shown), where the vacuum is released and gravity causes the seed to drop into soil below. Other types of metering devices are known and could readily be adopted into the row unit 24 of the present invention.

The furrowing disc 50 carried by the unit body 44 presses into the soil and rotates as the planter 10 travels along a field, displacing soil in the field to form a trench. The furrowing disc 50 can have any type of construction that allows for it to rotate as it is carried along the field to form a trench in the soil, such as the annular disc shape shown. While only one furrowing disc 50 is shown, it is contemplated that two or more furrowing discs can be included in the row unit 24. Many different types of furrowing disc constructions are known and could be included in the row unit 24. Optionally, the furrowing disc(s) 50 can be connected to the unit body 44 by a furrowing suspension assembly 64 including one or more adjustable gauge wheels 65 that are configured to adjust the depth of the trenches formed by the furrowing disc(s) 50 as the planter 10 travels along the field. Any suitable furrowing suspension assembly can be used to connect the furrowing disc(s) 50 to the unit body 44.

The mounting body 52, as shown, is bolted to the unit body 44 so that it can carry the connected closing discs 54 and pressing wheel 58 with the unit body 44 as the planter 10 travels across the field. While shown as being a separable piece from the unit body 44, the mounting body 52 can also be an integral part of the unit body 44, if desired. The mounting body 52 can be hollow to cover various components of the row unit 24. The profile and mounting angle of the mounting body 52 can be adjusted to cover adjacent assemblies or parts, as desired.

The pressing wheel 58, as shown, is a circular wheel that is pivotally connected to the mounting body 52 and connected to a pressing suspension assembly 56 so that the pressing wheel 58 can pack soil onto the placed seeds as the row unit 24 travels. The pressing wheel 58 is positionable behind the closing discs 54 in the direction of travel 46, so that soil is packed onto seeds that are already surrounded by soil to increase the seeds' soil contact. The pressing suspension assembly 56 can help regulate the amount of packing force the pressing wheel 58 applies to the soil as it travels. Any suitable pressing wheel 58 and pressing suspension assembly 56 can be included in the row unit 24.

The closing discs 54 carried by the unit body 44 are held behind the furrowing disc 50 in the direction of travel 46 and also rotate as the planter 10 travels along the field. The closing discs 54 are configured to be dug into the ground and collapse the trench that is formed by the furrowing disc 50, by replacing the soil that is dislocated by the furrowing disc 50 or dislocating soil adjacent to the trench into the trench as the closing discs 54 rotate. Any suitable closing discs can be included in the row unit 24. The closing discs 54 can have a closing suspension assembly 66 connecting the closing discs 54 to the mounting body 52 that assists in keeping the closing discs 54 at a uniform level within the soil as the planter 10 travels across the field. While the row unit 24 is shown as including a pair of closing discs 54, it is contemplated that one closing disc or more than two closing discs could be used. Further, the closing discs 54 do not need to be connected to the mounting body 52, but can also be connected to the unit body 44 so that the closing discs 54 are carried in the direction of travel 46 as the planter 10 and row unit 24 travel along the field.

Figure 3:
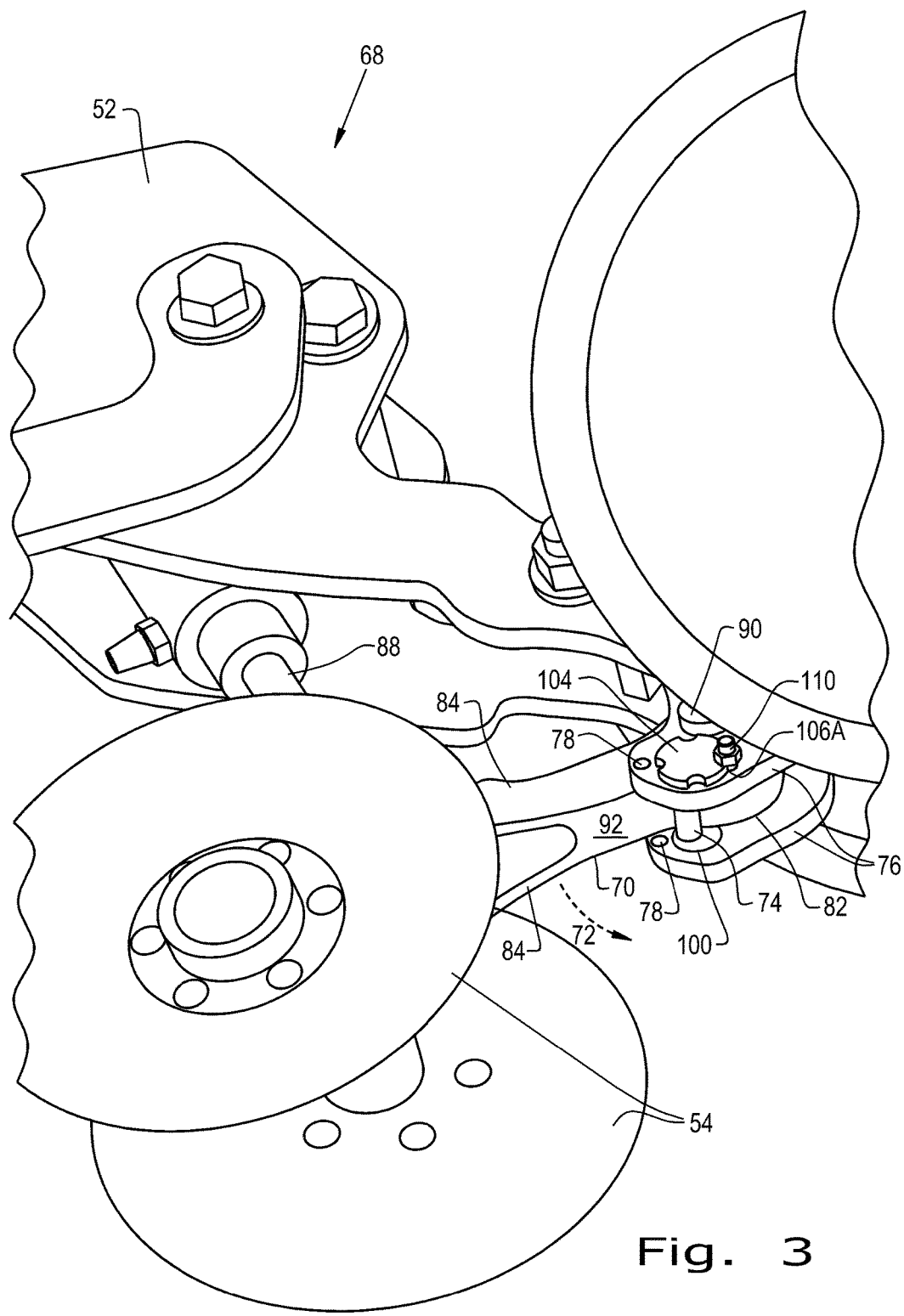
FIG. 3 is a perspective view of a portion of an embodiment of a closing assembly according to the present invention.
Figure 4:
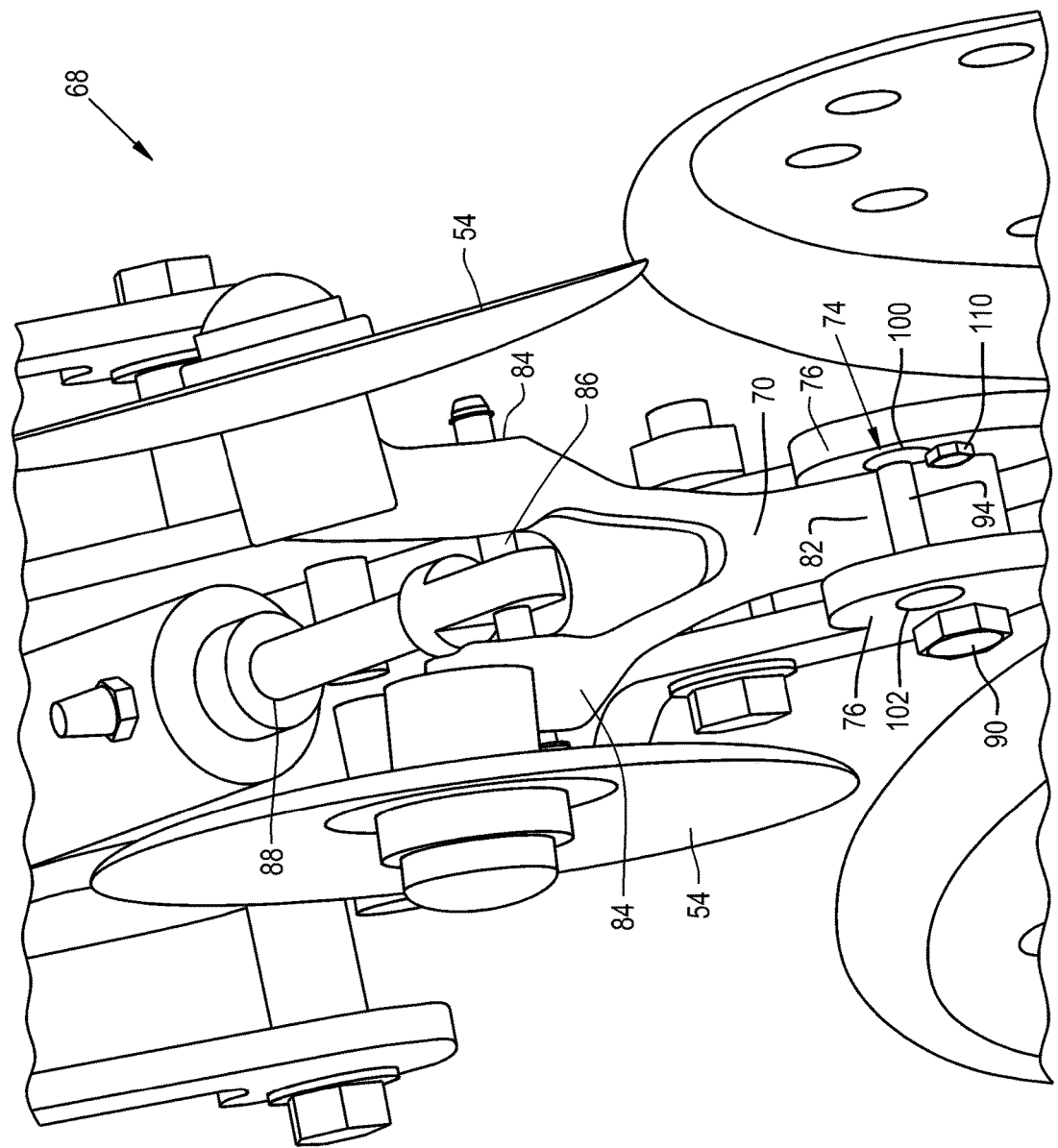
FIG. 4 is another perspective view of a portion of the closing assembly shown in FIG. 3.

Referring now to FIGS. 3-4, a closing assembly 68 is shown that includes the mounting body 52, a travel arm 70 pivotally connecting the closing discs 54 to the mounting body 52 and defining a travel path, indicated by dashed line 72, and a stop 74 placed in the travel path 72 of the travel arm 70 that limits a vertical travel of the closing discs 54. As used herein, "vertical" refers to the relative direction that gravity acts upon the row unit 24 as the row unit 24 travels across a ground surface, with the "upward" direction referring to movement away from the ground surface (opposite to gravity) and the "downward" direction referring to movement into or toward the ground surface (with gravity). It should be appreciated that the row unit 24 can be configured with the closing assembly 68 mounted to the unit body 44, as shown in FIG. 2, or the closing assembly 68 can be a separable assembly that is later connected to the row unit 24.

As can be seen in FIGS. 3-4, the mounting body 52 can include a pair of side plates 76 with a space formed therebetween. Each of the side plates 76 can have one or more stop openings 78, 80 formed therein that are sized to hold the stop 74, shown as a pin. Alternatively, only one of the side plates 76 can have one or more stop openings 78, 80 formed therein to hold the pin 74. Although the stop 74 is shown as a pin, other shapes and configurations can be chosen so long as the stop 74 can limit the vertical travel of the travel arm 70 and connected closing discs 54. The side plates 76 can be roughly identical, as shown, or different if desired. Each side plate 76 can have a first stop opening 78 that is aligned with a first stop opening 78 of the other side plate 76 and a second stop opening 80 that is aligned with a second stop opening 80 of the other side plate 76. By aligning the first stop openings 78 and second stop openings 80, the pin 74 can be held in both first stop openings 78 at the same time or both second stop openings 80 at the same time to limit the vertical distance that the closing discs 54 can be carried in the travel path 72 by the travel arm 70. In this sense, the maximum depth that the closing discs 54 can travel into the soil can be adjusted by changing the relative location of the stop openings 78, 80 on the side plates 76, which will alter where the pin 74 is held in the travel path 72 of the travel arm 70.

The travel arm 70, as shown, can include a pivot portion 82 pivotally connected to the mounting body 52 and one or more branch portions 84 that connect to the pivot discs 54. As can be seen in FIG. 4, a branching rod 86 (shown in FIG. 4) can connect the branch portions 84 to a biasing element 88, shown as a cylinder, to force the closing discs 54 in the downward direction and help keep the closing discs 54 engaged with soil as the row unit 24 travels across a field. The pivot portion 82 can be shaped with a circular cross-section and have an opening (not shown) that a mounting bolt 90 goes through to connect the travel arm 70 to the mounting body 52. The pivot portion 82 can be held within the space between the two side plates 76 of the mounting body 52, which can be useful to limit the side to side travel and rotation of the travel arm 70 during operation. In such a configuration, the distance between the two side plates 76 can be chosen to be slightly larger than the thickness of the pivot portion 82 so that there is limited sliding or rotation of the pivot portion 82 in the space. As shown, the travel path 72 of the travel arm 70 defines a circle with a radius that corresponds to the length of the travel arm 70 and is centered about the pivot portion's 82 connection to the mounting body 52 by mounting bolt 90. While the travel path is only illustrated with one dashed line 72, it should be understood that the travel path encompasses any location the travel arm 70 can travel, such as when the travel arm 70 pivots about the mounting bolt 90.

In operation, the closing discs 54 can be forced into the soil by the biasing element 88 exerting a downward force on the travel arm 70, which is connected to the closing discs 54, so that the closing discs 54 can maintain a desired contact with the soil. In some situations, the force that is applied to the closing discs 54 by the biasing element 88 may change. The change in applied force may be intentional to, for example, compensate for firmer soil conditions or caused by jolting forces that occur as the planter 10 carries the row unit 24 across the field. By placing the stop 74 in the travel path 72 of the travel arm 70, the amount of vertical travel that the travel arm 70 and connected closing discs 54 can undergo is limited by, for example, a bottom surface 92 of the travel arm 70 contacting a stop portion 94 (described further herein) of the stop 74, preventing the travel arm 70 and connected closing discs 54 from travelling any further in the travel path 72. While not shown, it should be appreciated that the stop 74 can also be placed so that the stop 74 limits the amount of upward travel that the travel arm 70 and connected closing discs 54 can undergo.

Figure 5:
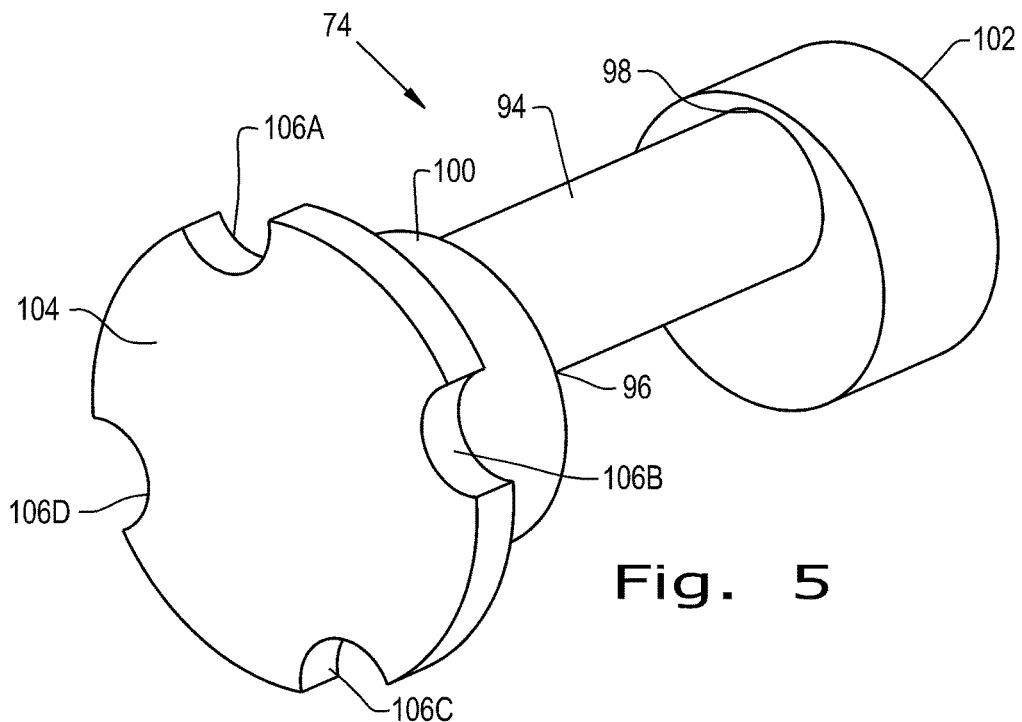
FIG. 5 is a perspective view of an embodiment of a stop according to the present invention.

Referring now to FIG. 5, the stop 74 is shown in better detail and can include a stop portion 94 defining a first end 96 and a second end 98, a first bearing portion 100 connected to the first end 96 of the stop portion 94, a second bearing portion 102 connected to the second end 98 of the stop portion 94, and an adjustment portion 104 connected to the first bearing portion 100 that includes adjustment features 106A, 106B, 106C, and 106D formed thereon. It should be appreciated that the adjustment portion 104 can be connected to the stop portion 94 by the first bearing portion 100 or directly. The stop portion 94 can be cylindrically shaped, as shown, with the first end 96 and second end 98 formed at longitudinal ends of the cylinder, but it should be appreciated that the stop portion 94 can have different shapes than cylindrical and the bearing portions 100 and 102 connected to the stop portion 94 do not need to be connected to the ends 96 and 98 of the stop portion 94. As can be seen in FIG. 5, the stop portion 94 is connected to the bearing portions 100 and 102 non-concentrically so that a rotation axis of the stop portion 94 does not overlap with rotation axes of the bearing portions 100 and 102, the significance of which will be described further herein. The bearing portions 100 and 102 can be shaped to have circular cross-sections and be sized to roughly match the first stop opening 78 and second stop opening 80, respectively, of the side plates 76 so the bearing portions 100 and 102 can rest within the stop openings 78 and 80 when the stop portion 94 is held in the space defined between the side plates 76.

The adjustment portion 104, as shown, can be connected to the first bearing portion 100 and be shaped as a disk defined about a center C1. It is also contemplated that the stop 74 can have two adjustment portions, with one adjustment portion connected to the first bearing portion 100 and another adjustment portion connected to the second bearing portion 102 or have a non-circular shape. The adjustment portion 104 can define a circumference 108, or a perimeter when the adjustment portion 104 is non-circular, about the center C1 that is larger than a perimeter of the bearing portions 100 and 102 and the stop openings 78 and 80. When the circumference 108 of the adjustment portion 104 is larger than the stop openings 78 and 80, the adjustment portion 104 can abut against the side plate 76 when the stop portion 94 is held in the space between the side plates 76 and prevent the stop 74 from being pushed through both stop openings 78 and 80. The adjustment portion 104 can be connected to the bearing portion 100 concentrically, as shown, so that center C1, which corresponds to a rotation axis of the adjustment portion 104, overlaps the rotation axis of the bearing portion 100, but when the adjustment portion 104, bearing portion 100 and stop portion 94 are all circular the adjustment portion 104 should not be concentric with both the stop portion 94 and the bearing portion 100, for reasons that will be described further herein.

Adjustment features 106A, 106B, 106C, and 106D are formed on the adjustment portion 104 and allow the stop portion 94 to be held at different locations in the travel path 72 of the travel arm 70. Adjustment portion 104 is shown with the four identical adjustment features 106A, 106B, 106C, and 106D equally spaced about the circumference 108 so that each adjustment feature 106A, 106B, 106C, and 106D forms a roughly 90 degree angle relative to the center C1 of the adjustment portion 104 and both adjacent adjustment features. However, it should be appreciated that a different number of adjustment features can be formed on the adjustment portion 104, the adjustment features can be differently shaped from one another, and the adjustment features can be either equally spaced or unequally spaced about the circumference 108 (or perimeter if the adjustment portion is non-circular). It should also be appreciated that the adjustment features 106A, 106B, 106C, and 106D do not need to be formed on the circumference 108 of the adjustment portion 104, or perimeter if the adjustment portion is non-circular. As shown, the adjustment features 106A, 106B, 106C, and 106D are formed as cut-outs in the circumference 108 of the adjustment portion 104. A bolt 110 can be placed through one of the cut-outs 106A, 106B, 106C, and 106D, such as cut-out 106A shown in FIG. 3, and an opening (not seen) formed in one of the side plates 76 to connect the adjustment portion 104 to the side plate 76, placing the stop portion 94 at a first relative location in the travel path 72 of the travel arm 70. If an operator wishes to adjust the relative location of the stop portion 94 in the travel path 72 of the travel arm 70 to, for example, adjust the allowed vertical travel of the travel arm 70 and connected closing discs 54, the adjustment portion 104 can be rotated so that cut-out 106A is no longer aligned with the opening formed in the side plate 76 and, for example, cut-out 106B is aligned with the opening formed in the side plate 76. The bolt 110 can then be placed through cut-out 106B and the opening to connect the adjustment portion 104 to the side plate 76 and place the stop portion 94 at a second relative location in the travel path 72 of the travel arm 70.

Figure 6:
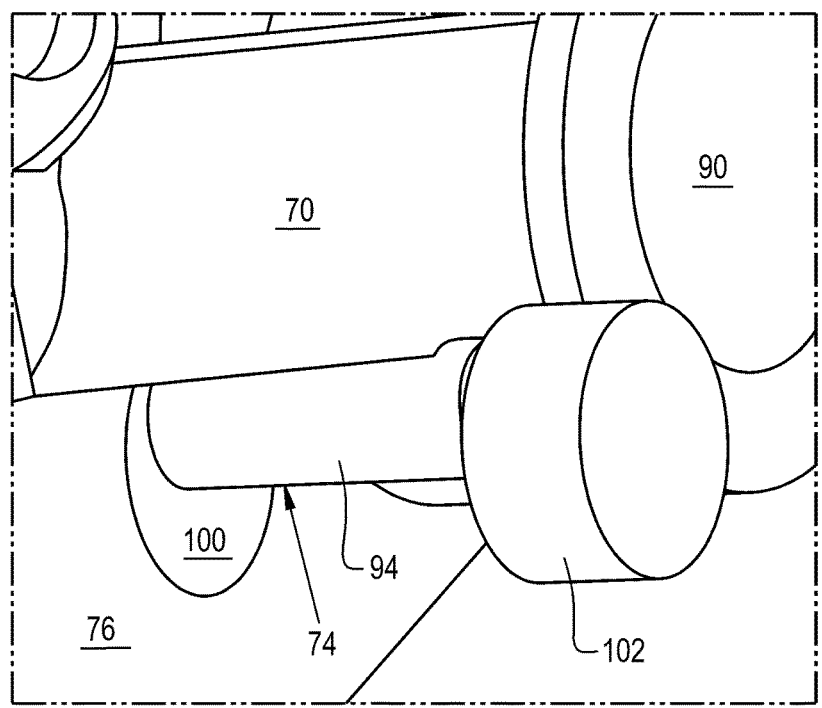
FIG. 6 is a sectional view of a portion of the closing assembly shown in FIGS. 3-4.

Referring now to FIG. 6, the stop 74 is shown with the stop portion 94 held in the space between the side plates 76, the bearing portions 100 and 102 held in their respective stop openings 80, and the adjustment portion 104 outside the space between the side plates 76. Since the adjustment portion 104 is concentric with the bearing portions 100 and 102 but not concentric with the stop portion 94, rotation of the adjustment portion 104 will cause a relative linear movement of the stop portion 94 in the space between the side plates 76 while keeping the adjustment portion 104, first bearing portion 100, and second bearing portion 102 linearly stationary. It should therefore be appreciated that the adjustment portion 104 can be modified in many different ways to includes adjustment features that allow for the relative location of the stop portion 94 in the travel path 72 of the travel arm 70 to be adjusted. For example, the number and spacing of adjustment features can be increased or decreased to alter the number of relative locations of the stop portion 94 in the travel path 72 as well as where the relative locations are. While the adjustment features 106A, 106B, 106C, and 106D are shown as cut-outs, the adjustment features 106A, 106B, 106C, and 106D can also be formed as other structural features, such as protrusions, that can interact with one or more structural elements of the row unit 24 to adjust the relative location of the stop portion 94 in the travel path 72 of the travel arm 70. It is further contemplated that the adjustment portion 104 may only have one adjustment feature that interacts with multiple structural elements of the row unit 24 to adjust the relative location of the stop portion 94 in the travel path 72 of the travel arm 70. As previously described, a second adjustment portion (not shown) with one or more adjustment features can also be connected to the stop portion 94, by second bearing portion 102 or directly, that allows the stop portion 94 to be held at same or different relative locations, compared to the adjustment portion 104, in the travel path 72 of the travel arm 70.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural planting apparatus, comprising:
   a chassis;
   a row unit carried by said chassis, said row unit including:
      a unit body carried by said chassis;
      a metering device carried by said unit body;
      at least one furrowing disc carried by said unit body;
      at least one pressing wheel carried by said unit body behind said furrowing disc in a direction of travel;
      a travel arm carried by said unit body, pivotally movable relative to said unit body and defining a travel path;
      at least one closing disc positioned behind said at least one furrowing disc and in front of said at least one pressing wheel in the direction of travel and pivotally movable along the travel path by said travel arm; and
      a stop having a stop portion placed in the travel path of said travel arm and configured to limit a vertical travel of said at least one closing disc, said stop having at least one adjustment feature formed thereon, said at least one adjustment feature allowing said stop portion to be held in at least two different locations in the travel path,
   wherein said stop includes an adjustment portion connected to said stop portion, said at least one adjustment feature being formed on said adjustment portion, and
   wherein said adjustment portion defines a disc having a circumference, said at least one adjustment feature being formed on said circumference.

2. The planting apparatus according to claim 1, wherein said at least one adjustment feature is at least one of a cut-out and a protrusion.

3. The planting apparatus according to claim 1, wherein said adjustment portion has at least three adjustment features formed thereon, said at least three adjustment features being equally spaced from one another on said circumference.

4. The planting apparatus according to claim 1, wherein said adjustment feature is non-concentrically connected to said stop portion.

5. The planting apparatus according to claim 4, wherein said stop includes at least one bearing portion having a substantially circular cross-section and connecting said adjustment portion to said stop portion.

6. The planting apparatus according to claim 5, wherein said adjustment portion is concentrically connected to said at least one bearing portion.

7. The planting apparatus according to claim 1, wherein said adjustment portion has at least two adjustment features formed thereon that are identical to one another.

8. The planting apparatus according to claim 1, wherein said stop includes a pair of bearing portions and said stop portion defines a first end and a second end, one of said bearing portions being connected to said first end and said adjustment portion and the other of said bearing portions being connected to said second end.

9. The planting apparatus according to claim 1, further comprising a mounting body with a pair of side plates defining a space therebetween carried by said unit body, said at least one adjustment feature being connected to at least one of said side plates such that said stop portion is held in said space.

10. The planting apparatus according to claim 9, wherein said travel arm is pivotally connected to said mounting body and held in said space.

11. An agricultural planting apparatus, comprising:
 a chassis;
 a row unit carried by said chassis, said row unit including:
  a unit body carried by said chassis;
  a metering device carried by said unit body;
  at least one furrowing disc carried by said unit body;
  at least one pressing wheel carried by said unit body behind said furrowing disc in a direction of travel;
  a travel arm carried by said unit body, pivotally movable relative to said unit body and defining a travel path;
  at least one closing disc positioned behind said at least one furrowing disc and in front of said at least one pressing wheel in the direction of travel and pivotally movable along the travel path by said travel arm; and
  a stop having a stop portion placed in the travel path of said travel arm and configured to limit a vertical travel of said at least one closing disc, said stop having at least one adjustment feature formed thereon, said at least one adjustment feature allowing said stop portion to be held in at least two different locations in the travel path,
 wherein said stop includes a pair of bearing portions connected to said stop portion and at least one adjustment portion connected to at least one of said bearing portions, said at least one adjustment feature being formed on said at least one adjustment portion.

12. The planting apparatus according to claim 1, wherein said stop has at least two adjustment features formed thereon.

13. The planting apparatus according to claim 11, wherein at least one bearing portion of the pair of bearing portions has a substantially circular cross-section and connects said adjustment portion to said stop portion.

14. The planting apparatus according to claim 13, wherein said adjustment portion is concentrically connected to said at least one bearing portion.

* * * * *